United States Patent Office 3,320,322
Patented May 16, 1967

3,320,322
PURIFICATION PROCESS
William K. Langdon, Grosse Ile, and Michael Kokorudz,
Wyandotte, Mich., assignors to Wyandotte Chemicals
Corporation, Wyandotte, Mich., a corporation of
Michigan
No Drawing. Filed Aug. 2, 1963, Ser. No. 299,470
17 Claims. (Cl. 260—593)

The present invention relates to a process for the purification of halogenated ketones, and is more particularly concerned with the use of hypohalites to purify 1,1,1-trihalo-2-ketones, with the preparation of 1,1,1-trihalo-2-ketones free from undesirable 1,3-polyhalo-2-ketone by-products, such as 1,3-dihalo- and 1,1,3-trihalo-2-ketones, and with the elimination of such 1,3-polyhalo-2-ketones from mixtures thereof with 1,1,1-trihalo-2-ketones.

The 1,1,1-trihalo-2-ketones are useful intermediates for the preparation of various useful compounds such as medicinals. For example, 1,1,1-trichloroacetone is a useful intermediate in the preparation of Isopral (1,1,1-trichloroisopropanol) which is used as a somnifacient, as described in the Dispensatory of the United States of America, 23rd Edition, 1943, p. 1410. It is stated to have about the same therapeutic effect as chloral hydrate.

Because of their considerable utility as chemical intermediates, various methods of producing 1,1,1-trihalo-2-ketones have been developed. For example, the use of about three moles of free halogen to one mole of ketone or two moles of free halogen to one mole of monohalogenated ketone, as disclosed in U.S. Patent 2,199,934, are among the simplest procedures. In another method, metal halides are employed in lieu of the free halogen, as in U.S. Patent 2,567,569. However, these and other methods of producing 1,1,1-trihalo-2-ketones have a major shortcoming in that they are not entirely selective and produce quantities of undesirable by-products, including 1,3-polyhalo-2-ketones. Many of these by-products, and especially 1,3-polyhalo-2-ketones, are difficult to remove from the desired product by conventional purification procedures, such as distillation, and as a result their elimination is costly and frequently reduces the yield of desired 1,1,1-trihalo-2-ketone considerably. Obviously, a simple method of preparing or purifying 1,1,1-trihalo-2-ketones whereby the undesired by-products are avoided or eliminated would be of great value.

It is therefore an object of the present invention to provide a novel method for purifying 1,1,1-trihalo-2-ketones. An additional object is the provision of a method for preparing 1,1,1-trihalo-2-ketones free from undesired 1,3-polyhalo-2-ketones. Another object is to provide a novel method of removing other halogenated ketones from 1,1,1-trihalo-2-ketones. A further object is to provide a method of treating mixtures of 1,1,1-trihalo-2-ketones and 1,3-halo-2-ketones, including mixtures of compounds having the formula:

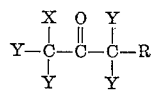

wherein X is a halogen, R is a radical selected from the group consisting of alkyl, aryl, hydrogen, and halogen, and Y is hydrogen or halogen, at least a part of the starting halogenated material being a 1,1,1-trihalo-2-ketone, to give a substantially pure 1,1,1-trihalo-2-ketone having the formula:

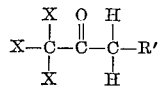

wherein R' is a radical selected from the group consisting of alkyl, aryl, and hydrogen, and X has the value previously assigned. Another object is to provide a method of purifying 1,1,1-trihalo-2-ketones of impurities resulting from their production according to conventional halogenation procedures. Additional objects will be apparent to one skilled in the art and still other objects will become apparent hereinafter.

The foregoing and additional objects are accomplished by treating mixtures comprised of 1,1,1-trihalo-2-ketones and 1,3-polyhalo-2-ketones with a hypohalite, wherein the halogen has an atomic weight of at least 35, within a carefully controlled pH range. The objects of the invention may also be accomplished by simultaneously halogenating and purifying 2-ketones, especially 1-halo- or 1,1-dihalo-2-ketones, or mixtures thereof contained in crude halogenation mixtures with 1,3-polyhalo-2-ketones, with a hypohalite under controlled conditions. By careful control of the pH and temperature of reaction, 1,1,1-trihalo-2-ketones of high purity are obtained in good yield, the undesired 1,3-polyhalo-2-ketone by-products being selectively destroyed during the course of the reaction.

One of the better-known reactions of organic chemistry is that of a hypohalite and a methyl ketone to produce a haloform and an acid through a scission reaction, viz.:

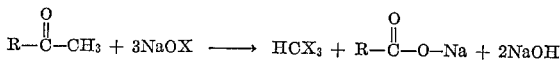

(Noller, Chemistry of Organic Compounds, 2 ed., W. B. Saunders Co., Philadelphia, 1957, p. 215.) The scission apparently results from reaction of evanescent 1,1,1-trihalo-2-ketone with base formed in the reaction:

(Noller, op. cit., p. 214.) It is therefore to be expected that methyl ketones will undergo scission, i.e., undergo a haloform-type reaction, when treated with a hypohalite under weakly basic conditions. However, it has now been found that 1,1,1-trihalo-2-ketones, containing as impurities ketones having halogen substituted at both the 1- and 3-carbon positions, may be purified by treating the mixture with a hypohalite in aqueous solution maintained within a carefully controlled pH range.

The 1,3-polyhalo-2-ketones are subjected to scission and eliminated while the 1,1,1-trihalo-2-ketones remain unchanged. Moreover, when 1-halo-2-ketones and 1,1-dihalo-2-ketones are initially present in the crude reaction mixture, they are halogenated during the purification process to 1,1,1-trihalo-2-ketones, with the result that the end product is a substantially pure 1,1,1-trihalo-2-ketone. Consequently, the combined purification and halogenation process may be utilized with crude halogenation mixtures resulting from many of the processes discussed above, and containing 1,3-polyhalo-2-ketones as well as 1-halo-2-ketone and 1,1-dihalo-2-ketones, to produce a pure 1,1,1-trihalo-2-ketone.

Although the present invention is not to be limited by theory, it is believed that the presence of a halogen atom at the 1- and 3-positions causes the molecule to be more susceptible to the haloform scission reaction. Thus, by treating mixtures of 1,1,1-trihalo-2-ketones and 1,3-polyhalo-2-ketones within the specified pH range, the undesired 1,3-polyhalo-2-ketones are caused to undergo scission whereas the desired 1,1,1-trihalo-2-ketone is unaffected and remains intact. As a result, the product of the purification process consists of the desired 1,1,1-trihalo-2-ketone substantially uncontaminated by other halogenated ketones. Moreover, any 1-halo-2-ketones or 1,1-dihalo-2-ketones which may be present are converted to the desired 1,1,1-trihalo-2-ketone by the hypohalite.

Compounds which may be purified by the present invention are 1,1,1-trihalo-2-ketones containing a minor proportion of ketones having halogen substituted at both the 1- and 3-positions, such as the crude product of the reaction of about 2 to 3 molar proportions of halogen with 1 molar proportion of methyl ketone, e.g., from the chlorination of acetone. A portion of the ketone may comprise a hydrocarbon radical having up to ten carbon atoms which may optionally be substituted with groups which are unreactive to hypohalite, such as alkoxy and nitrogroups, as well as halo groups which are substituted on carbon atoms not adjacent to the carbonyl group. Especially preferred are those compounds in which the alkyl group is a straight chain lower-alkyl radical having from one to eight carbon atoms. However, although the alkyl radical-containing ketones are suitable for use in the invention, the present process is particularly designed for use with halogenated acetones.

Examples of 1,1,1-trihalo-2-ketones which may be purified by the process of the invention are:

1,1,1-trichloroacetone,
1,1,1-tribromoacetone,
1,1-dibromo-1-chloroacetone,
1,1-dichloro-1-bromoacetone,
1,1-dibromo-1-fluoroacetone,
1-bromo-1-chloro-1-fluoroacetone,
1,1,1-trichloro-2-butanone,
1,1,1-tribromo-2-butanone,
1,1-dichloro-1-bromo-2-butanone,
1-chloro-1,1-dibromo-2-butanone,
1-fluoro-1-chloro-1-bromo-2-butanone,
1,1,1-trichloro-2-pentanone,
1,1,1-tribromo-2-pentanone,
1-bromo-1-fluoro-1-chloro-3-ethyl-2-pentanone,
1,1,1-trichloro-2-heptanone,
1,1-dichloro-1-bromo-2-pentanone,
1-bromo-1,1-difluoro-4-phenyl-2-butanone,
trichloromethylphenyl ketone,
tribromomethylphenyl ketone,
bromodichloromethyl phenyl ketone,
bromodichloromethyl chlorophenyl ketone,
and the like.

The process of the invention is carried out by treating the crude 1,1,1-trihalo-2-ketone with a hypohalite in aqueous solution having a pH in the range of about 6 to about 10 and preferably about 6.5 to about 8. The reaction may be carried out at a temperature in the range of about 0° to about 70° C., and preferably from about 0° to about 35° C. The hypohalite should be one, the halogen of which has an atomic weight of at least 35.

Examples of the 1,3-polyhalo compounds which may be present in the starting mixture as impurities and which will be removed by the present purification process are:

1,3-dichloroacetone,
1,1,3-trichloroacetone,
1,1,1,3-tetrachloroacetone,
1,1,1,3,3-pentachloroacetone,
1-bromo-3-chloroacetone,
1,3-dibromoacetone,
1-bromo-3-fluoroacetone,
1,1-dibromo-3-chloroacetone,
1,1-dibromo-1,3-dichloroacetone,
1,3-dichloro-2-butanone,
1-fluoro-3-bromo-2-butanone,
1-bromo-3-fluoro-2-butanone,
1-bromo-1-chloro-3-fluoro-2-butanone,
1,3-dibromo-1-chloro-3-fluoroacetone,
1,1,3,3-tetrachloro-2-butanone,
1-bromo-3-chloro-2-pentanone,
and the like.

If the mixture contains 1-halo-2-ketones which are only partially halogenated in the 1-carbon position, the treatment with the hypohalite further halogenates the 1- carbon to convert the compounds to 1,1,1-trihalo-2-ketones at the same time that the 1,3-polyhalo-2-ketone is being subjected to scission and elimination. Among such 1-halo-2-ketones are the following:

1-chloroacetone,
1,1-dichloroacetone,
1-bromoacetone,
1,1-dibromoacetone,
1-bromo-1-chloroacetone,
1-bromo-2-butanone,
1-chloro-2-butanone,
1,1-dichloro-2-butanone,
1-bromo-1-chloro-butanone,
1,1-difluoro-2-butanone,
1-bromo-1-fluoro-2-butanone,
1,1-difluoro-2-pentanone,
1-bromo-1-chloro-2-butanone,
1-bromo-1-fluoro-2-pentanone,
1-bromo-1-fluoro-3-ethyl-2-pentanone,
1-chloro-2-heptanone,
phenacyl chloride,
phenacyl bromide,
p-chlorophenacyl chloride,
and the like.

Any of several different procedures may be employed for reacting the hypohalite halogenating agent of the present invention, e.g., the hypochlorite, hypobromite, or hypoiodite, with the mixtures to be purified. In general, the reactants need merely be brought into contact with each other, and several procedures are available for such purpose, e.g., (a) the introduction of hypohalite directly into the reaction mixture, and (b) the generation of hypohalite in situ in the aqueous reaction medium.

Examples of (a) are:

(1) The hypohalite may be introduced as a salt, e.g., sodium hypochlorite, calcium hypochlorite, or magnesium hypobromite.

(2) The hypohalite may be introduced as the acid, e.g., hypochlorous acid or hypobromous acid.

(3) The hypohalite may be introduced in the form of certain organic compounds, e.g., an alkyl hypohalite such as tertiary butyl hypochlorite.

Examples of (b) are:
(1) The reaction of a base with a halogen, e.g., $$2NaOH + Cl_2 \rightarrow NaCl + NaOCl + H_2O$$
$$NaHCO_3 + Cl_2 \rightarrow NaCl + HOCl + CO_2$$

(2) The reaction of a metal oxide with a halogen, e.g.,

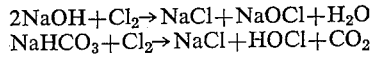

(Other metal oxides useful in this reaction are: zinc oxide, calcium oxide, silver oxide, copper oxide, and the like.)

(3) The reaction of other, e.g., organic compounds to yield hypohalites, e.g., the reaction of dichlorocyanuric acid, salts of dichlorocyanuric acid and trichlorocyanuric acid, 1,3-dichloro-5,5-dimethylhydantoin, or other compounds which will furnish active chlorine, with water, for example:

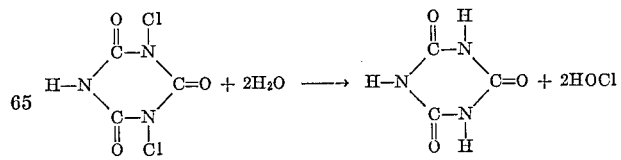

Since many of the 1,1,1-trihalo-2-ketones employed as starting materials are insoluble in water, the preferred procedure is to form an aqueous emulsion by adding the ketone to water with vigorous stirring, adjust the emulsion thus formed to a temperature of about 0° to about 70° C., preferably from about 10° to about 40° C., and then introduce the hypohalite. Many other equivalent procedures may be employed, e.g., the order of addition of the haloketone, water and bicarbonate may be interchanged, although the hypohalite must be added after all the other reactants are present in the reactor.

One of the most important considerations in carrying out the process of the present invention is the maintenance of the pH of the aqueous reaction mixture. It is essential that the pH be maintained at a value in the range of about 6.0 to about 10.0, and preferably about 6.5 to about 8.0. If the pH rises to too high a value, the haloform reaction will take place with the 1,1,1-trihalo-2-ketone, with resulting scission of the product. On the other hand, if the value of the pH becomes too low, scission of the 1,3-polyhalo-2-ketone will not take place.

Since by-products are produced in the process of the present invention which tend to change the pH of the reaction mixture in one direction or the other, means must be provided for maintaining the pH within the desired range during the reaction. The mechanism of the present reaction is such that when a free halogen such as chlorine is passed into the system, it dissolves in and reacts with the water present, forming a hydrogen halide such as hydrogen chloride (HCl) and a hypohalite such as hypochlorous acid (HOCl). The latter material serves as the halogenation agent of the invention. If the by-product HCl were permitted to accumulate in the system, the pH would fall to a low value and the hypochlorination reaction would not proceed in the desired manner. Consequently, according to one embodiment of the invention, sodium bicarbonate is maintained in the system in excess in order to serve as an acid receptor and neutralize the acid formed. In this manner the pH is maintained in the desired range. If an insufficient amount of sodium bicarbonate is added, it will become completely used up, and the further formation of unneutralized HCl will cause the pH to fall outside the optimum range. Other acid acceptors such as magnesium oxide, sodium carbonate, a mixture of sodium carbonate and sodium bicarbonate, magnesium carbonate, zinc oxide, and a mixture of sodium dihydrogen phosphate and disodium hydrogen phosphate may also be used.

Alternatively, when hypochlorination is accomplished by adding a hypochlorite in salt form, such as sodium hypochlorite or calcium hypochlorite, the hypochlorite solution continually tends to become more basic, and requires a corresponding continuous incremental addition of an acid such as phosphoric acid to maintain the pH within the desired range.

Among the methods which may be used to maintain the pH of the reaction mixture within the desired range are the following:

(1) Continuous incremental addition of acid, as by adding phosphoric acid, to maintain a desired reading on a pH meter when the hypochlorite is added in salt form, such as sodium hypochlorite or calcium hypochlorite. In this form, the hypochlorite solution is basic and requires the continuous addition of an acid to maintain the pH within the desired range.

(2) Conducting the reaction in a buffered solution, such as a solution containing sodium dihydrogen phosphate and disodium hydrogen phosphate.

(3) Utilizing a method of generating hypohalite in which the acid formed by solution of chlorine in water is continuously neutralized by reaction with an acid salt such as sodium bicarbonate.

(4) Utilizing a method of generating hypohalite in which the acid formed by solution of the halogen in water is continuously neutralized by reaction with the oxide of a metal which forms an amphoteric hydroxide, such as the reaction of magnesium oxide with the hydrohalide.

(5) Adding hypochlorous acid (HOCl) itself while maintaining the pH within the desired range by the presence of a buffer in the solution.

Of these procedures for controlling pH, those designated 3 and 4 are preferred.

Other reaction conditions do not appear to be particularly critical. Pressure may vary without affecting the products to any great extent. The basic hypohalogenation reaction appears to be almost instantaneous. However, practically, time limitations are imposed upon the reaction by physical limitations on addition rate and heat of reacton dissipation. The only requirement in regard to reaction time is that, for optimum yields, it be sufficient for the reaction to go to completion. Usually, when the hypohalite is introduced directly, the reaction is complete in thirty minutes to an hour and, when the hypohalite is generated in situ, in ninety minutes or more. Although recovery and purification of the desired product may be effected in any one of various ways, the insolubility of 1,1,1-trihalo-2-ketones in water simplifies the recovery of the desired reaction products. The organic portion of the reaction product may, for example, be collected by separation or decantation and, after the initial separation, the aqueous portion may be extracted with an organic solvent, such as benzene, carbon tetrachloride, chloroform, or the like, in order to remove any small amounts of trihaloketone that may be in solution, the mixture separated, and the organic portion combined with the extracts. The combined organic portions may then be distilled to separate starting material, small quantities of haloform, and the organic solvent used for the extraction, from the desired product.

The present invention may be combined with conventional halogenation processes to great advantage. For example, acetone or other methyl ketones may be reacted with chlorine in a ratio of one mole of the organic material to about 2 to 3 moles of chlorine and subsequently treated by the process of the present invention to yield the 1,1,1-trihalo-2-ketone, e.g., 1,1,1-trichloroacetone, in high purity.

The following examples are given by way of illustration only and are not to be construed as limiting.

*Example 1.—Production of 1,1,1-trichloroacetone*

Crude (undistilled) chlorinated acetone (1254 grams), containing 3.3% of monochloro-2-propanone, 77.4% of 1,1-dichloro-2-propanone, 1.6% of 1,1,1-trichloro-2-propanone, 9.6% of 1,3-dichloro-2-propanone, and 8% of 1,1,3-trichloro-2-propanone, was chlorinated in the presence of 1554 grams (18.5 moles) of commercial sodium bicarbonate and 2.5 liters of water with 950 grams (13.4 moles) of chlorine at 28 degrees centigrade over a period of eight hours.

The lower layer which contained the chlorinated acetone (1209 grams) was separated and combined with 25 grams of chlorinated acetone recovered from the upper layer by azeotropic distillation. The combined chlorinated product was analyzed by gas-liquid chromatography. According to the gas-liquid chromatography analysis, the percentages were chloroform 12.2%, 1,1-dichloro-2-propanone 4.2%, and 1,1,1-trichloro-2-propanone 64.1%. Conversion to 1,1,1-trichloro-2-propanone was 64.1%, yield 67.0%, of the theoretical based on acetone. The product upon distillation gave 945 grams (58.5%) of 1,1,1-trichloro-2-propanone, 115 grams (about 10%) of chloroform, 53 grams (4.2%) of 1,1-dichloro-2-propanone, 38 grams (3%) of a mixture of 1,1-dichloro-2-propanone and 1,1,1-trichloro-2-propanone, and 47 grams of residue.

*Example 2*

By the direct chlorination of acetone (1160 g.; 20 moles) in water (1440 ml.; 80 moles) containing 40 ml. of 37% HCl with chlorine (2130 g.; 30 moles), a mixture of 1-chloroacetone, 1,1-dichloroacetone, 1,1,1-trichloroacetone, 1,3-dichloroacetone, 1,1,3-trichloroacetone, and some tetrachloro- and pentachloroacetone were prepared. Two hundred fifty-four grams (approximately 2 moles)

of this crude chlorinated acetone were treated with 252 grams (3 moles) of sodium bicarbonate and 1000 ml. (55 moles) water and chlorinated with 190 grams (2.7 moles) of chlorine. The reaction was carried out over a temperature range of 12–26° C. and required about 1½ hours for the chlorination. The lower organic layer was separated and distilled, giving the following products:

| | G. |
|---|---|
| Chloroform, boiling 61–75° C. | 36 |
| Mixed monochloroacetone, 1,1 - dichloroacetone, and 1,1,1-trichloroacetone, boiling 114–122° C. | 27 |
| Mixture of approximately 20% 1,1-dichloroacetone and 80% 1,1,1-trichloroacetone, boiling 122–133° C. | 49 |
| 1,1,1-trichloroacetone, boiling 135° C. | 130 |
| Residue | 24 |

Conversion to 1,1,1-trichloroacetone was calculated to be 70% of theory.

*Example 3.—Preparation of 1,1,1-tribromoacetone*

By direct bromination of acetone (1160 grams; 20 moles) in water (1440 ml.; 80 moles) containing 40 ml. of 37% HCl with bromine (4865 grams; 30 moles), a mixture of 1-bromoacetone, 1,1-dibromoacetone, 1,1,1-tribromoacetone, 1,3-dibromoacetone, 1,1,3-tribromoacetone and some tetrabromo- and pentabromoacetone was prepared. Four hundred grams (approximately 2 moles) of this crude brominated acetone were treated with 252 grams (3 moles) of sodium bicarbonate and 1000 ml. (55 moles) water and brominated with 430 grams (approximately 2.7 moles) of bromine. The reaction was carried out over a temperature range of 20–40° centigrade, requiring about 2 hours for the bromination. The lower organic layer, after separation and distillation, gave the following products:

Bromoform, boiling at about 145–152° centigrade;
Mixed monobromoacetone, 1,1-dibromoacetone, and 1,1,1-tribromoacetone, boiling at about 38–40° centigrade at 20 mm.;
Mixed 1,1-dibromoacetone and 1,1,1-tribromoacetone boiling at about 60–125° centigrade at 20 mm.;
1,1,1-tribromoacetone, boiling at about 126–130° centigrade at 14 mm.; and
Residue.

Conversion to 1,1,1-tribromoacetone was about 40% of theory.

*Example 4.—Purification of 1,1,1-trichloroacetone*

One hundred and sixty-one grams (approximately 1 mole of 1,1,1-trichloroacetone containing a small amount of 1,3-polyhaloacetone were dispersed in 500 ml. (26 moles) of water containing 84 grams (1 mole) of sodium bicarbonate. This mixture was held at a temperature of 4–7° centigrade for 2½ hours while 55 grams (approximately 0.8 mole) of chlorine were added. Essentially all the 1,1,1-trichloroacetone was recovered. Chromatograms showed no 1,3-polyhaloacetone present.

Various modifications and equivalents will be apparent to one skilled in the art and may be made in the method of the present invention without departing from the spirit or scope thereof, and it is therefore to be understood that the invention is to be limited only by the scope of the appended claims.

We claim:
1. A process for purifying a 1,1,1-trihalo-2-ketone contained in a mixture thereof with a 1,3-polyhaloacetone present as an impurity, which comprises reacting said mixture with a hypohalite in aqueous medium, the halogen of said hypohalite having an atomic weight of at least 35, while maintaining the pH in the range of about 6 to about 10 and separating the 1,1,1-trihalo-2-ketone from the resulting mixture.

2. A process according to claim 1, wherein the pH is maintained in the range of about 6.5 to about 8.

3. A process according to claim 1, wherein the temperature of the reaction is maintained within the range of about 0° to about 70° C.

4. A process for purifying a 1,1,1-trihaloacetone contained in a mixture thereof with a 1,3-polyhaloacetone present as an impurity, which comprises reacting said mixture with a hypohalite in aqueous medium, the halogen of said hypohalite having an atomic weight of a least 35, while maintaining the pH in the range of about 6 to about 10 and separating the 1,1,1-trihaloacetone from the resulting mixture.

5. A process according to claim 4, wherein the pH is maintained within the range of about 6.5 to about 8.

6. A process for purifying 1,1,1-trichloroacetone contained in a mixture thereof with a 1,3-polychloroacetone present as an impurity, which comprises reacting said mixture with a hypochlorite in aqueous medium, while maintaining the pH in the range of about 6 to about 10 and separating the 1,1,1-trichloroacetone from the resulting mixture.

7. A process according to claim 6, wherein the pH is maintained in the range of about 6.5 to about 8.

8. A process according to claim 6, wherein the temperature of the reaction is maintained in the range of about 0° to about 70° C.

9. A process for purifying 1,1,1-trichloroacetone contained in a mixture thereof with a 1,3-polychloroacetone present as an impurity, which comprises reacting said mixture with chlorine in the presence of an aqueous solution of sodium bicarbonate while maintaining the pH in the range of about 6 to about 10 and separating the 1,1,1-trichloroacetone from the resulting mixture.

10. A process for the simultaneous production and purification of a 1,1,1-trihalo-2-ketone contained in a crude halogenation mixture comprising a 1-halo-2-ketone and a 1,3-polyhaloacetone which comprises reacting said mixture with a hypohalite in aqueous medium, the halogen of said hypohalite having an atomic weight of at least 35, while maintaining the pH in the range of about 6 to about 10 and separating the 1,1,1-trihalo-2-ketone from the resulting mixture.

11. A process according to claim 10, wherein the pH is maintained in the range of about 6.5 to about 8.

12. A process according to claim 10, wherein the temperature of the reaction is maintained in a range of about 0° to about 70° C.

13. A process for the simultaneous production and purification of a 1,1,1-trihaloacetone from a crude halogenation mixture comprising a 1-haloacetone and a 1,3-haloacetone which comprises treating said mixture with a hypohalite in aqueous medium, the halogen of said hypohalite having an atomic weight of at least 35, while maintaining the pH in the range of about 6 to about 10 and separating the 1,1,1-trihaloacetone from the resulting mixture.

14. A process for the simultaneous production and purification of 1,1,1-trichloroacetone from a crude halogenation mixture comprising a 1-chloroacetone and 1,3-chloroacetone which comprises treating said mixture with a hypochlorite in aqueous medium, while maintaining the pH in the range of about 6 to about 10 and separating the 1,1,1-trichloroacetone from the resulting mixture.

15. A process according to claim 14, wherein the pH is maintained in the range of about 6.5 to about 8.

16. A process for the simultaneous production and purification of 1,1,1-trichloroacetone from a crude halogenation mixture comprising 1-chloroacetone, 1,1-dichloroacetone, and 1,3-dichloroacetone which comprises treating said mixture with a hypochlorite in aqueous medium while maintaining the pH in the range of about 6 to about 10 and separating the 1,1,1-trichloroacetone from the resulting mixture.

17. A process for the simultaneous production and purification of 1,1,1-trichloroacetone from a crude chlorination mixture comprising 1-chloroacetone, 1,1-dichloroacetone, and 1,3-dichloroacetone which comprises reacting said mixture with chlorine in an aqueous medium containing sodium bicarbonate while maintaining the pH in the range of about 6 to about 10.

References Cited by the Examiner

Fieser et al.: Organic Chemistry, 3rd. edition, pages 154–155 (1956).

DANIEL D. HORWITZ, *Acting Primary Examiner.*